July 13, 1965 M. C. IWERKS 3,195,127
RATE-AIDED MANUAL TRACKING CIRCUIT
Filed April 17, 1962
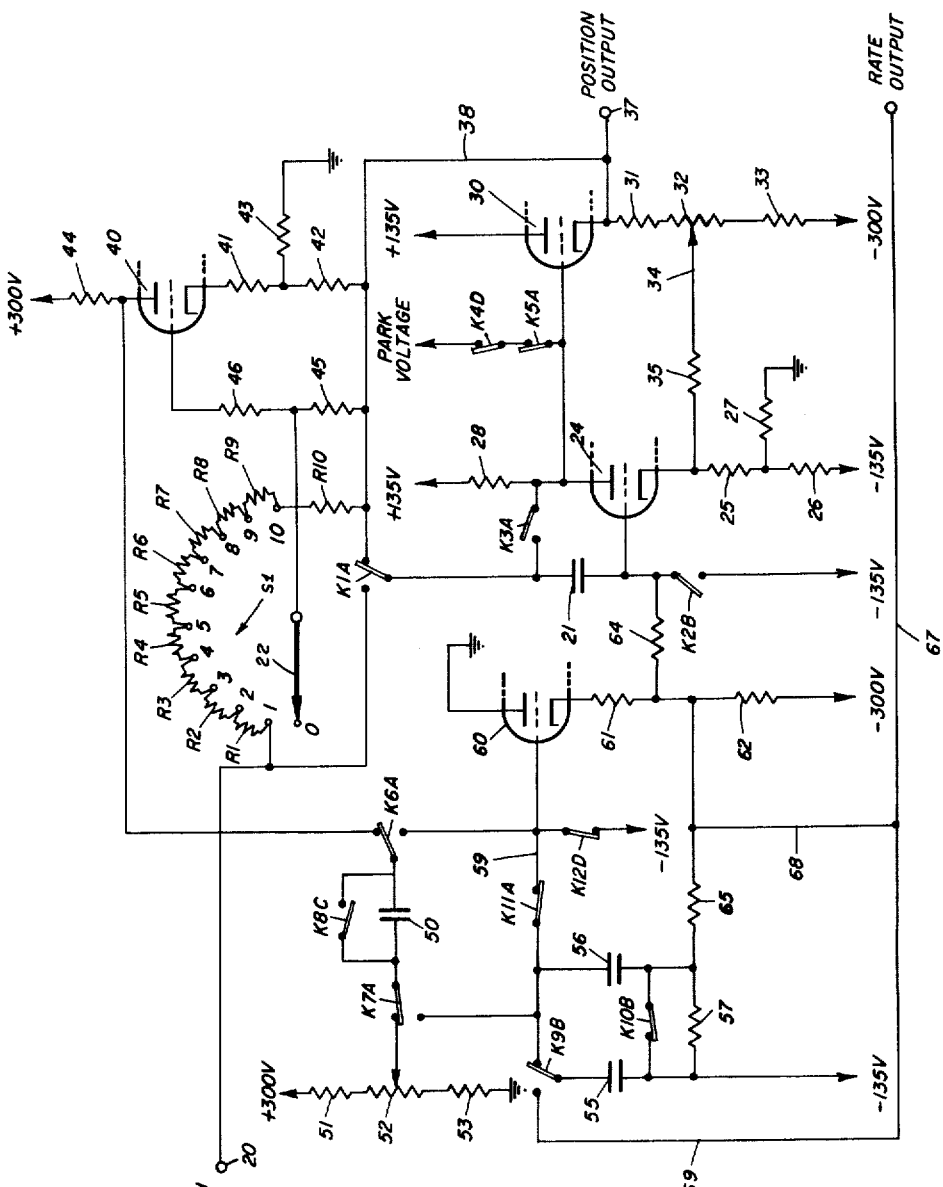
INVENTOR
MARVIN C. IWERKS
BY Claude Funkhouser
ATTORNEY

United States Patent Office 3,195,127
Patented July 13, 1965

3,195,127
RATE-AIDED MANUAL TRACKING CIRCUIT
Marvin C. Iwerks, Basking Ridge, N.J., assignor, by mesne assignments, to the United States of America as represented by the Secretary of the Navy
Filed Apr. 17, 1962, Ser. No. 188,289
6 Claims. (Cl. 343—7)

This invention relates to radar equipment and more particularly to a circuit for rate-aided manual target tracking channels of radar designation equipment.

In all tactical radar systems electronic circuit means are provided to obtain target position, speed and course from search radar data for the target designation equipment. These qualities are required for the evaluation of target threat and for the designation of targets to fire control radars. In previous systems, automatic Track-While Scan was used to help relieve the operator tracking load in obtaining this data. However, experience has shown that for targets in the presence of noise and for targets on closely parallel or crossing courses, the tracking channels must be operated manually. This seriously limits the number of channels which can be handled by each operator. In addition, the equipment required for automatic Track-While-Scan systems is quite complex.

Accordingly, it is a primary object to provide a target tracking channel which overcomes the above noted disadvantages of the automatic Track-While-Scan systems without unduly taxing the work load of the operator.

A more specific object is to provide a tracking channel capable of automatically predicting future target positions.

A further object is to provide a tracking channel which can be readily seized by the operator to initiate manual control when predicted target positions fail to accurately anticipate future target position.

A still further object is to provide a tracking channel which operates automatically to correct stored quantities when the operator seizes manual control.

Other objects and advantages will appear from the following description of one embodiment of the invention, and the novel features will be particularly pointed out hereinafter in connection with the appended claims.

The sole figure of the drawing shows a circuit embodiment of the invention.

Modern target designation equipment employ a plan plot indication which presents search radar data in a slant range by bearing display. For any target following a straight line course at a constant speed other than toward the position of the radar equipment, both bearing and range vary in a non-linear relationship. However, if X-Y coordinates are used for target tracking, the coordinates of the target position change linearly for those targets of constant rate traveling any straight line course other than one near the center of the display. Tracking in X-Y coordinates was thus selected as the most logical method for the rate-aided manual tracking channel.

To identify target positions, magnitudes of X and Y coordinates are presented by voltages and the quadrant in which the target is located is determined by the polarity of these voltages. A pantograph is used to position a play back spot over the video return, and output voltages from the potentiometers driven by the pantograph represent the X-Y coordinates of the target position. These voltages are stored in the track channel and upon successive timed determinations of position for a moving target, voltages representing X and Y components of target rate are computed and stored. These rate voltages are then integrated into the position stores, resulting in a smooth, continuous prediction of target position. The channel output is used to position a play back spot on the PPI as a visual indication of target predicted position. When the spot does not coincide with the target video, stored position voltages can be changed under the control of the operator and rate voltages automatically corrected.

Referring now to the sole figure of the drawing, target position data in either X or Y coordinates derived from the pantograph, not shown, is applied to input terminal 20. This input signal is applied through normally open relay contact K1A to the upper plate of capacitor 21 and in addition to a rotary selector S1 which comprises a plurality of weighted resistors R1 through R10 serially connected by contacts 1 through 10. The rotary selector S1 may be any well known stepping switch, such as those used in the telephone art, wherein the arm of the switch is advanced by energizing a magnetic coil, and here the selector arm 22 having a normal position indicated as 0 sweeps over these contacts, being driven by a motor, cam and microswitch arrangement (not shown), to effectively insert these weighted resistors into the grid circuit of amplifier 40. This operation will be described in detail hereinafter. The lower plate of capacitor 21 is connected to a —135 v. supply through normally open relay contact K2B and to the grid of amplifier tube 24. The cathode of the amplifier tube 24 is connected to a —135 v. supply through a voltage divider circuit comprising resistors 25 and 26 with the intermediate point therebetween grounded through resistor 27. The plate of amplifier tube 24 is connected to a +135 v. supply through resistor 28 and is also joined to the upper plate of capacitor 21 through normally open relay contact K3A. The output signal on the plate of the amplifier tube 24 is fed to the grid of cathode follower tube 30. A "park" or standby voltage of sufficient value to position the playback spot off the PPI display screen is coupled to the grid of cathode follower tube 30 through normally closed relay contacts K4D and K5A. The plate of cathode follower tube 30 is connected to a +135 v. supply while the cathode is connected to a —300 v. supply through a voltage divider circuit comprising resistors 31, 32 and 33. The resistance 32 of this potential divider circuit constitutes a potentiometer having a slider 34 connected through resistor 35 to the cathode of amplifier tube 24. The output signal from the cathode of cathode follower 30 appears at output terminal 37 to be used to position the playback spot. In addition this output signal is fedback over feedback line 38 and through normally closed relay contact K1A to capacitor 21. An amplifier 40 has a cathode connected to the feedback line 38 through serially connected resistors 41 and 42 with a point therebetween grounded through resistor 43. The plate of amplifier 40 is connected to a +300 v. supply through resistor 44 while the grid is connected to the feedback line through resistors 45 and 46. A point intermediate resistors 45 and 46 is connected to the sweep arm 22 of rotary selector S1 while weighted resistor R10 is connected to feedback line 38.

The output is taken from the plate of amplifier 40 and fed to capacitor 50 through normally closed relay contact K6A. A voltage divider circuit is connected between a +300 v. supply and ground and comprises resistors 51, 52 and 53 with resistor 52 having a slider contact connected through relay contact K7A to the other plate of storage capacitor 50. The storage capacitor 50 is shorted upon itself through a circuit including the normally open relay contact K8C. When relay contact K7A opens a circuit is completed connecting the capacitor 50 to the parallel combination of capacitors 55 and 56 and resistor 57 through normally closed relay contact K9B. The capacitors 55 and 56 are selectively shorted upon each other through normally closed relay contact K10B. A line 59 connects the parallel combination of capacitors 55 and 56 to the grid of cathode follower tube 60 through normally closed relay contact K11A. The capacitor 50 is connected to line 59 through normally open relay contact K6A and a —135 v. supply is also applied to line 59 through normally closed relay contact K12D. The plate of cathode follower 60 is grounded while the cathode is connected to a —300 v. supply through serially connected resistors 61 and 62. The output from cathode follower tube 60 appearing at a point intermediate resistances 61 and 62 is coupled to the grid of amplifier tube 24 and the lower plate of capacitor 21 through resistance 64. This output is further coupled through resistor 65 to the parallel combination of capacitors 55 and 56 and also to rate output line 67 through connection 68. Capacitor 55 of the parallel combination is connected to the rate output line 67 over line 69 upon operation of relay contact K9B.

Before going into a description of the operation of the circuit of FIG. 1, it should be appreciated that the operator through appropriate sequential operation of the relays can perform an "assign" function whereby the channel playback spot is initially positioned by the storage of X–Y voltages received from the pantograph. The operator may if desired initiate data rate aided operation such that the channel playback spot is repositioned to current target position by a change in the stored X–Y voltages. On the first data insertion after assignment, voltages proportional to rates are determined from the change of position voltages and the time elapsed since assignment. These rate voltages are stored and integrated into position voltages. On subsequent data insertions, voltages proportional to the difference between stored rates and indicated rates are determined and used to correct the stored rate voltages. Furthermore the operator may initiate data-manual operation whereby the channel marker is repositioned as above but stored rate voltages remain unchanged. Furthermore the operator may place the tracking channel in release condition where the channel position voltages are changed to a park or standby value sufficient to position the playback spot off the PPI display, and rate voltages are then returned to zero.

The circuitry of FIG. 1 is employed for one coordinate of the tracking channel and it will be appreciated that for a second coordinate identical circuitry is used, however the vacuum tubes and relays may be common to both coordinates. The relay control circuitry has not been shown for the sake of simplicity since it forms no part of the present invention and it is apparent that appropriate control circuitry could be designed by one skilled in the art. Those relay contacts bearing the same letter designation operate in unison and may, if desired, be controlled by a single relay. Accordingly, those relay contacts having the letter designation "A" may be controlled by a single relay RA. The remaining relay contacts may be similarly grouped and considered as being controlled by relays RB, RC and RD. The sequence of operation of the various relays for the various channel functions initiated by the operator is as follows:

(1) Assign:
   (a) Relay RA operates
   (b) Relay RB operates
   (c) Relay RD operates
   (d) Relay RB releases
   (e) Relay RA releases
(2) Data-rate aided:
   (a) Relay RA operates
   (b) Relay RB operates
   (c) Relay RB releases
   (d) Relay RA releases
(3) Data-manual:
   (a) Relay RC operates
   (b) Relay RA operates
   (c) Relay RB operates
   (d) Relay RB releases
   (e) Relay RA releases
   (f) Relay RC releases
(4) Release: (a) Relay RD releases When the channel is in the release condition the "Assign" function only is enabled and the selector arm 22 is in the normal or 0 position. Upon assigning the channel, the "Assign" function is disabled and all other functions are enabled. The rotary selector arm then operates upon energization of a stepper motor, not shown, one step every four seconds, to cause the playback spot to progressively advance along the projected course. Should there be a divergence between the playback spot and the radar echo, the operator, through operation of the pantograph, repositions the playback spot to correct the error and again activates the "assign" relay which removes potential from the rotary selector S1 and this causes the selector arm to return to normal through spring action, and the remainder of the circuit to function according to the newly assigned channel. If a repositioning occurs before the selector has advanced to contact 1, it is assumed that a repositioned error has occurred. To prevent an erroneous rate change from being computed the "Data Manual" sequence is automatically followed.

Now referring to drawing, the position storage circuit is a low gain integrating amplifier consisting of amplifier tube 24, cathode follower 30 and storage capacitor 21 along with its associated circuitry. The rate computer comprises the amplifier 40 and rotary selector S1. The cathode follower 60 constitutes along with capacitors 55 and 56 a store for the target rate. To obtain a continuous prediction of position, the rate of position change is integrated by the position storage amplifier 24. It should be noted that rate voltage is stored with respect to a —135 v. This permits the use of direct coupling in the interstage of the position storage amplifier, eliminating the usual D.C. coupling loss.

To the initiation of the assign function, the channel is released and the position output is connected to the "park" voltage supply through relay contacts K4D and K5A. To assign a channel, the pantograph playback spot is superimposed upon a video return, and an assign pushbutton is operated, actuating the assign relay sequence shown above. A voltage representing the pantograph position is applied to position input and the relay RA operates. Relay contact K1A breaks the feedback loop of the position storage amplifier 24 and connects one end of capacitor 21 to position input terminal 20. Relay contact K5A removes the "park" voltage from the channel. The grid of cathode follower tube 30 is connected to position input terminal by the closure of relay contact K3A to prevent the output of the cathode follower tube from shifting too far afield. Relay RB operates to connect the grid of amplifier tube 24 directly to the —135 v. supply such that the capacitor 21 is charged rapidly to a voltage representing the difference between —135 v. and the position input signal. Relay RD then operates and locks up for the duration of the channel assignment to insure that the park voltage is removed from the channel after relay RA releases.

Operation of the rate storage portion of the circuit during this sequence of relay operation has been ignored since relay contact K12D have kept the grid of cathode follower tube 60 connected directly to a —135 v. supply thus preventing any rate voltage from being stored. With no rate voltage stored, the magnitudes of resistors 61 and 62 are such that —135 v. is supplied to resistor 64. This represents zero rate at the integrating input of the position storage amplifier 24. The operation of relay RD removes the —135 v. supply from the grid of cathode follower 60 so that rate can be stored in subsequent channel operations.

Next, relay RB releases removing the —135 v. supply from the grid of amplifier tube 24. This in turn is followed by the release of relay RA, which disconnects capacitor 21 from position input terminal 20 and replaces it in the feedback loop of the position storage amplifier 24. If the grid of amplifier 24 is maintained at —135 v., there will be no voltage drop across resistor 64 and therefore no current flow therethrough to change the charge on capacitor 21. Position will then be stored on capacitor 21, the charge leaking off only through the high resistance represented by leakage across the capacitor and from the grid of amplifier 24 to ground. Without some means of compensation however, the grid of amplifier 24 can not be maintained at −135 v. for any value of position storage other than zero, especially with a low gain storage amplifier such as used here. This would result in inaccurate storage, and non linear integration for any fixed rate voltage supplied to resistor 64. Stored position output would fall short of stored position input by an amount equal to position input divided by the gain of the position storage amplifier 24 as measured from the grid. For example, if position input were +50 v. and the gain was 50, position output would be +49 v. In addition, if a rate voltage of 5 v. were applied to resistor 64 and the integration process allowed to continue for a time sufficient to drive position output from 50 v. to −50 v. the change from the average voltage on the grid of amplifier 24 would vary from −1 v. to +1 v. The effective rate voltage the storage amplifier sees is the voltage drop across resistor 64, which is driving current into capacitor 21. The effective rate would then be 6 v. at the beginning of the track and 4 v. at the end.

To eliminate these errors, compensation is built into the position storage amplifier so that for all position output voltages, the grid of amplifier 24 is maintained at −135 v. The voltage divider comprising resistors 26 and 27 provide for the average bias for amplifier 24. Current through this divider is large compared to the space current of the amplifier. Resistors 31, 32 and 33 in the cathode circuit of cathode follower 30 are of such magnitude that the slider of resistor 32 is at the same voltage as the cathode of amplifier 24 when position output is zero. This is about −133 v. Resistor 25 is much smaller than resistor 28 so that the degenerative feedback introduced into amplifier 24 is kept to a minimum. Thus it can be seen that for any desired Position Output voltage, the change from average bias on amplifier 24 to produce that voltage is introduced at the cathode. The grid must then remain at −135 v. Within the limits of accuracy of the electronic components therefore, the voltage applied to the Position Input will be stored and appear as Position Output, and the effective rate voltage that the position storage amplifier sees is the actual rate voltage applied to resistor 64.

Upon initiation of the assigned function, the rotary selector S1 is energized and operates one step every four seconds. When the video return has moved away from the channel playback spot, the operator superimposes the pantograph spot on the new video position and operates the "Data-Rate Aided" function. Relay sequence for this function shown above then occurs and the new position is stored as previously described. In addition, the change in position storage is divided by the time elapsed since the last operation, to obtain a voltage proportional to rate which is also stored.

As can be seen when the selector S1 is on normal or (0) position, both the grid and cathode of amplifier 40 are connected to Position Output via feedback line 38. For any other position of selector arm 22, the cathode is connected to Position Output while the grid is connected to Position Input through selector arm 22 and resistor 46. The signal applied to amplifier 40 is then some part of the difference between these two voltages. The gain of amplifier 40 is such that for selector arm 22 on contact (1), the rate output (departure of plate voltage from that for zero signal) is proportional to the position difference divided by 4 seconds.

Capacitor 50 is connected between resistor 52 and the plate of amplifier 40. If resistor 52 is adjusted so that the voltage across capacitor 50 is zero for position difference of zero or when the selector arm of rotary selector S1 is on position (0), then any rate voltage developed at the plate of amplifier 40 will be impressed across this capacitor. It will be noted however, that amplifier 40 being a triode and that while the plate load resistor is returned to a fixed voltage, the voltages at the grid and cathode can vary appreciably depending on magnitude and polarity of position voltages. This would represent a large change in the effective B+ and since a triode is not a constant current device when supplied with a changing B+, compensation is necessary. Without compensation, the voltage across capacitor 50 would not remain zero in absence of a signal applied to amplifier 40 but would be dependent on position voltage. This could indicate a false rate of appreciable magnitude.

Resistors 42 and 43 provide a means of compensation to make amplifier 40 constant current under these conditions. If the current through resistors 42 and 43 is large with respect to the space current of the amplifier, it can be seen that the voltage at the junction of these two resistors is proportional to Position Output in magnitude and of the same polarity. This magnitude can be made such that a change in Position Output will apply a change in bias to the amplifier just sufficient to maintain space current constant with no signal.

Returning now to consideration of the relay sequence for the data-rate-aided function, and the actual storage of computed rate, capacitors 55 and 56 are the rate storage capacitors and are connected in parallel from −135 v. supply to the grid of cathode follower 60. When relay RA operates, contact K11A opens and contacts K7A and K6A close to place capacitor 50 in series with capacitors 55 and 56 to the grid of cathode follower 60. Voltage at the grid of cathode follower 60 is thus changed by the voltage across capacitor 50. Relay RB then operates. Contact K9B shifts to connect capacitor 55 to the output of cathode follower 60 so that the capacitor can charge to the new value of rate voltage. At the same time, contact K10B removes the short across resistor 57, changing the voltage on the grid of cathode follower 60 an amount determined by the stored rate voltage. This in effect makes cathode follower 60 a unity gain cathode follower during the time of rate storage. Capacitor 55 then charges to a voltage sufficient to produce the desired rate voltage at resistor 64 when capacitor 55 is returned to the grid of cathode follower 60. When relay RB releases, the short is returned across resistor 57 and capacitor 55 is again placed parallel with capacitor 56. There will be a voltage change across the parallel combination of these capacitors caused by equalization of charge thereon. If capacitor 56 is small with respect to capacitor 55, this change will be small. In any case, its effect can be accounted for in the selection of scale factors for that rate voltage.

When a rate voltage is stored at cathode follower 60, a voltage other than −135 v. appears across resistor 64. This causes the position amplifier to begin its integration process, resulting in continuous prediction of Position Output. When relay RA releases, the rotary selector S1 has been returned to normal (0), and it again begins to step one position every four seconds in preparation for the next rate computation.

Circuit operation is as described above for subsequent data insertions. Rate voltage is computed as the difference between predicted Position Output and Position Input, and is added to capacitors 55 and 56 by means of capacitor 50, correcting the stored rate.

It may be desirable at times to change position storage without changing the stored rate. As was previously mentioned, this relay sequence is automatically employed if a data insertion is made before selector has moved off position (0). When the "Data-Manual" push button is operated, relay sequence noted above occurs. It will be noted that except for relay RC operating first and releasing last, this sequence is the same as the relay sequence for the data-rate aided function. Circuit operation is then the same as that described previously except that relay contact K8C shorts out capacitor 50, and change in rate storage is zero.

When it is no longer desirable to track a video return, the channel is released by operation of the "Release" button. This releases relay RD and contact K12D connects the grid of cathode follower 60 to −135 v. supply returning rate storage to zero. Relay contact K4D applies the "park" voltage to Position Output, positioning the channel marker beyond the range of the PPI display.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A rate-aided manual target tracking channel for use in a radar system comprising storage means for storing the target rate, integrating means responsive to the stored target rate for predicting future target positions, computing means responsive to said integrating means and target position input signals for deriving a corrective rate signal, and means responsive to said corrective rate signal for altering the stored target rate whereby predicted target positions will more nearly correspond to future target positions.

2. A rate-aided manual target tracking channel for use in a radar system comprising storage means for storing target rate signals, integrating means responsive to said stored target rate signals for predicting future target positions, means responsive to said predicted target positions and target position input signals for correcting the rate signals retained in said storage means whereby predicted target positions will more nearly conform to future target positions.

3. A rate aided manual target tracking channel for use in a radar system comprising
capacitive means for receiving a voltage commensurate with actual target position,
means for computing from said actual target position voltage a voltage commensurate with predicted target rate,
means for integrating said predicted target rate voltage to obtain a predicted target position voltage,
capacitive altering means for providing a correction voltage, and means for feeding said correction voltage to said means for integrating.

4. A rate-aided manual target tracking channel for use in a radar system as in claim 3 wherein said means for altering includes a voltage dividing means.

5. A rate-aided manual target tracking channel for use in a radar system comprising
capacitive means for receiving a voltage commensurate with target position,
means for differentiating said target position voltage to obtain a voltage commensurate with predicted target rate,
means for selectively storing said predicted target rate voltage, and
means for computing a voltage commensurate with predicted target position from said target rate voltage.

6. A rate-aided manual target tracking channel for use in a radar system comprising
capacitive means for receiving a voltage commensurate with target position,
means for differentiating said target position voltage to obtain a voltage commensurate with predicted target rate,
means for storing said predicted target rate voltage,
integrating means for summing said stored predicted target rate voltages to obtain a predicted target position voltage,
capacitive altering means for providing a correction voltage, and
means to feed the correction voltage to the input of said integrating means.

References Cited by the Examiner

UNITED STATES PATENTS

| | | | |
|---|---|---|---|
| 2,849,707 | 8/58 | White | 343—7.3 |
| 3,040,311 | 6/62 | Segerstrom | 343—7.3 |
| 3,078,457 | 2/63 | Himler et al. | 343—7.3 |
| 3,086,201 | 4/63 | Smith et al. | 343—7.3 |

CHESTER L. JUSTUS, *Primary Examiner.*